Dec. 2, 1941.  W. T. SMITH ET AL  2,264,918
GRINDING MACHINE
Filed Feb. 21, 1940  4 Sheets-Sheet 1

Inventors
William T. Smith
Charles M. Buie
By Cushman, Darby, & Cushman
Attorneys Dec. 2, 1941.   W. T. SMITH ET AL   2,264,918
GRINDING MACHINE
Filed Feb. 21, 1940   4 Sheets-Sheet 2

Inventors
William T. Smith
Charles M. Buie

Dec. 2, 1941.　　　W. T. SMITH ET AL　　　2,264,918
GRINDING MACHINE
Filed Feb. 21, 1940　　　4 Sheets-Sheet 3

Inventors
William T. Smith
Charles M. Buie.

By Cushman, Darby, & Cushman
Attorneys

Patented Dec. 2, 1941

2,264,918

UNITED STATES PATENT OFFICE 2,264,918

GRINDING MACHINE

William Thomas Smith and Charles Malcolm Buie, New Bern, N. C., assignors of one-third to Allie Edgerton, Goldsboro, N. C.

Application February 21, 1940, Serial No. 320,192

14 Claims. (Cl. 51—48)

The present invention relates to grinding machines and especially to grinding machines designed for sharpening lawn mowers.

An object of the invention is the provision of a machine of this character which is capable of sharpening a lawn mower without dismantling the mower and removing the cutter reel and stationary blade. The present machine is furthermore adapted to sharpen the cutter reel without the necessity of removing the stationary blade. Likewise, the stationary blade of the mower may be sharpened without removing the cutter reel, the only requisite being to move the stationary blade out of cutting engagement with the cutter reel.

Another object is to provide mechanism for easily and quickly adjusting the grinding tool of the machine relative to the work. In this connection means are provided to move the grinding tool in both horizontal and vertical directions to effect the desired adjustment.

A further object is the provision of a grinding machine having a main frame and an auxiliary carriage supporting frame which is both pivotally and slidably mounted in the main frame to permit rapid adjustment of the carriage relative to the lawn mower.

Another object is to provide a clutch mechanism for controlling the movement of the grinding carriage, said mechanism effecting a snap action in throwing the clutch into and out of its clutching positions, and maintaining the clutch in each of its operative positions under spring pressure.

With the foregoing and other objects in view, the invention will now be more fully described, reference being had to the accompanying drawings in which.

Figures 1, 5, 6, 7:
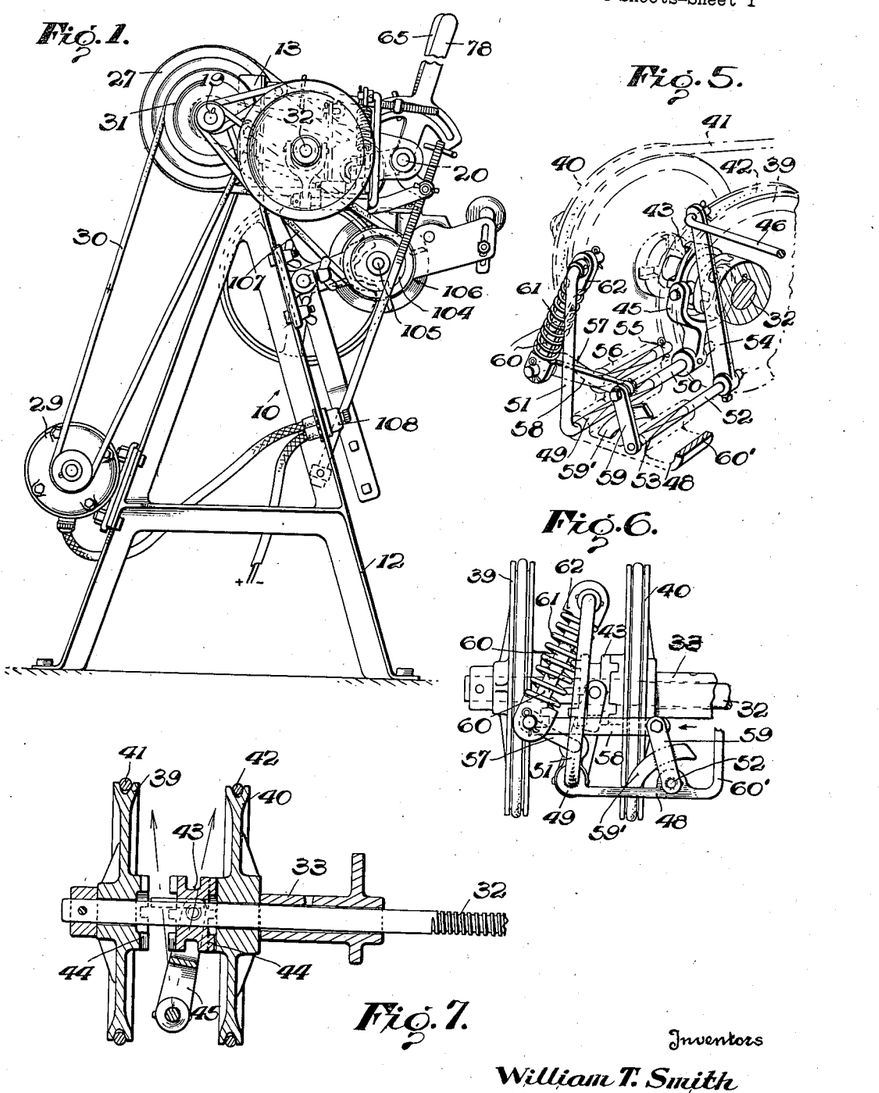
Figure 1 is an end elevation of the machine.
Figure 5 is an enlarged perspective detailed view of the clutch operating mechanism.
Figure 6 is an enlarged front elevation of the clutch operating mechanism.
Figure 7 is an enlarged sectional view of the clutch collar and the pulleys for driving the screw shaft.
Figures 2, 3, 4:
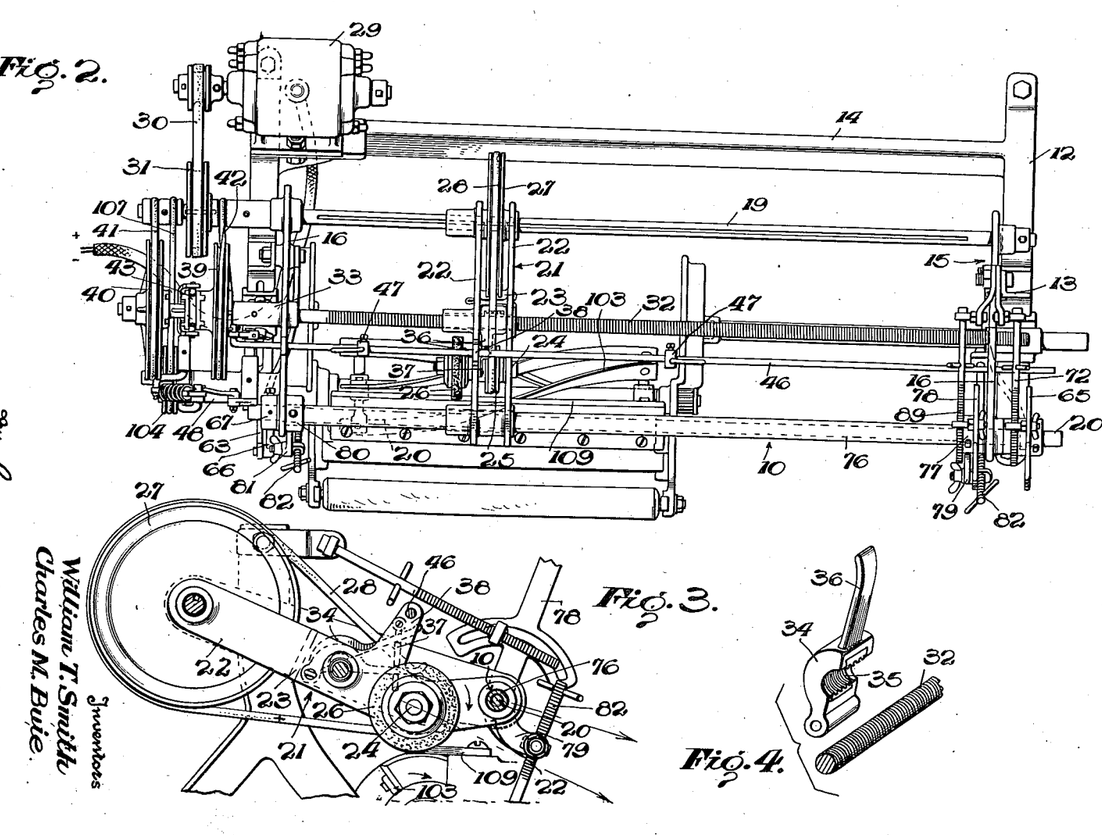
Figure 2 is a top plan view thereof.
Figure 3 is a side elevation of the grinding carriage.
Figure 4 is an enlarged fragmentary view of the driving nut and a portion of the screw shaft associated therewith.
Figures 8, 9:
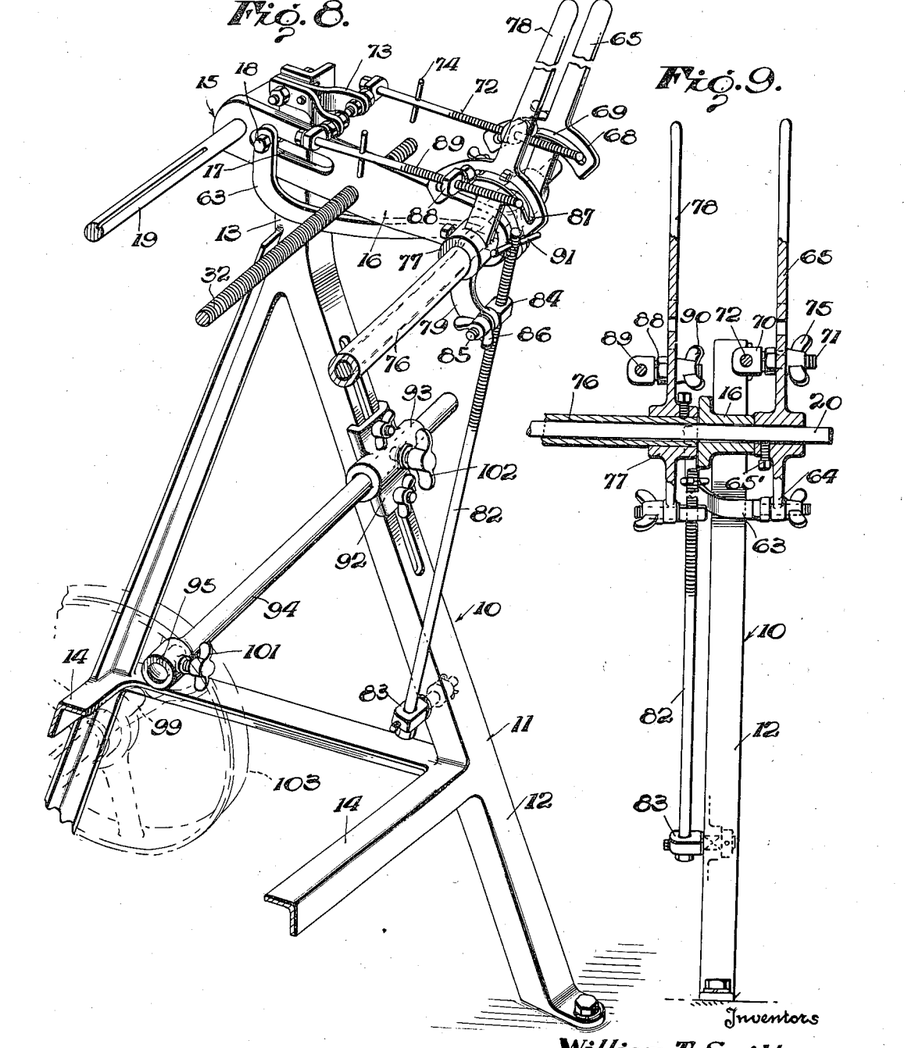
Figure 8 is a perspective view of a portion of the machine showing the mechanism for adjusting the auxiliary frame relative to the work.
Figure 9 is a front view partly in section of the hand levers for adjusting the auxiliary frame.

Referring now to the drawings, and particularly to Figures 1, 2 and 8, the numeral 10 designates generally the grinding machine forming the subject-matter of the present invention. This machine comprises a main frame 11 having end sections 12, each comprising legs of angle-iron formation, which are inclined upwardly and merge into a single top portion 13. These end sections 12 may be made up of separate legs or may be formed as integral units, as desired. As shown in the drawings, front and rear horizontal bars 14 connect the sections 12 adjacent their lower ends.

The main frame 11 adjustably supports an auxiliary frame 15, which extends longitudinally of the main frame and is pivotally and slidably mounted thereon between the upstanding members 13. As shown in Figures 2 and 8, the auxiliary frame comprises a pair of end plates 16, each provided with a longitudinally extending slot 17 adjacent its rear end. A fastening element or bolt 18 is provided for each plate 16 and passes through the slot 17, being secured to the portion 13 of its perspective section 12. As will be described hereinafter, the auxiliary frame 15 is pivotally and slidably supported on the main frame about the bolts 18.

Journalled in the rear of the auxiliary frame is the main drive shaft 19 of the machine which cooperates with a front shaft 20 to slidably support a grinding carriage 21. When the machine is in operation, this carriage is adapted to reciprocate back and forth on the shafts 19 and 20 between the end plates 16, and effect the grinding operation. As shown in Figures 2 and 3, the carriage 21 comprises a pair of parallel plates 22, which are connected by crosspieces or webs 23. Referring particularly to Figure 3, it will be observed that the plates 22 are somewhat angular in formation so as to provide a relatively low area in which is journalled a shaft 24. A small pulley 25 is fixed to the shaft 24 between the plates 22. The shaft 24 is provided with a portion extending beyond one of the plates 22, and upon this extension is fixed a grinding wheel 26. A large pulley wheel 27 is mounted upon the drive shaft 19 between the plates 22. In order to transmit power from the drive shaft 19 to the grinding wheel, the pulley 27 is splined to the shaft and thereby rotates with the shaft, but is free to slide thereon with the carriage. A belt 28 operatively connects the pulleys 25 and 27 whereby rotation of the shaft 19 will, in turn, rotate the pulley 27, pulley 25 and grinding wheel 26. It will be observed that the pulley 25 is relatively small as compared to the pulley 27, so that the grinding wheel will be rotated at a relatively high speed. The main power shaft 19 derives its power from a motor 29 which is connected through a belt 30 to a pulley 31 fixed to one end of the shaft 19, as shown in Figures 1 and 2.

In order that the carriage 21 may be reciprocated back and forth on the auxiliary frame 15 during rotation of the grinding wheel 26, a feed or screw shaft 32 is provided. This shaft is screw threaded throughout the greater portion of its length, but is provided with an unthreaded portion adjacent one end, this end being journalled in a sleeve 33 attached to one of the end plates 16, as shown in Figure 2. Upon the carriage 21 is pivotally mounted a driving nut 34, which is provided with a threaded portion 35, cooperating and engageable with the feed shaft 32. This nut has a forwardly extending arm 36 by which it can be raised and lowered into and out of operative engagement with the screw shaft 32. In order to prevent accidental disengagement of the nut from the screw shaft, a spring finger 37 is carried by an arm 38 forming an extension of one of the plates 22. This finger yieldably engages the arm 36 to hold it in operative position. However, when it is desired to release the nut from the screw shaft, the finger 37 is of sufficient resiliency to permit the arm to pass upwardly to the dotted line position shown in Figure 3. It is to be understood that when the nut is released from the screw shaft, the carriage may be manually moved to any desired position on the auxiliary frame by sliding the same on the shafts 19 and 20. The openings in the plates 22 through which the screw shaft 32 passes, are of sufficient size to prevent binding of the carriage and to permit it to be moved on the frame when the nut is released from the screw shaft.

While the present invention may be utilized for grinding different kinds of work, it is particularly adapted for sharpening lawn mowers and, as will be explained in detail hereinafter, means are provided for supporting a lawn mower in inverted position on the main frame below the carriage 21, so that the latter may be reciprocated back and forth in contact with the cutting elements of the law mower. It is, therefore, necessary that the direction of rotation of the feed shaft 32 be constantly reversed to reciprocate the carriage across the work, and this is accomplished by employing clutching mechanism which is controlled by movement of the grinding carriage.

Referring particularly to Figures 2 and 7, the unthreaded portion of the feed shaft 32 on the left hand side of the bearing 33 loosely carries a pair of pulleys 39 and 40. The pulley 39 is connected to the main drive shaft 19 through a belt 41, while pulley 40 derives its power from shaft 19 through belt 42, this latter belt being twisted so that pulley 40 will rotate in the opposite direction to the pulley 39. A clutch collar 43 is keyed to the shaft 32 between the pulleys 39 and 40 and is adapted to be moved into and out of engagement with clutch elements 44, each secured to an inner face of one of the pulleys 39 and 40. A fork or yoke 45 is operatively connected to the collar 43 and is adapted to be actuated by carriage control mechanism to alternately disengage the clutch collar from the element 44 of one pulley and slide it into engagement with the clutch element of the other pulley, thereby reversing the rotation of the feed screw and in turn reversing the movement of the carriage 21 in the auxiliary frame 15.

The mechanism for reversing the rotation of the feed screw comprises a reversing rod 46 which extends lengthwise of the auxiliary frame 15 and passes through an opening in the arm 38. Mounted on the rod 46 are a pair of stop elements 47 which are capable of being adjusted to any desired position. As shown in Figure 2, these elements are so mounted that the carriage 21 reciprocates on the frame 15 and is gradually moved into contact with one or the other of the stop elements. When this occurs the carriage will move the rod 46 either to the right or to the left and, in so doing, will actuate the clutch operating mechanism, which will now be described in detail.

This clutch operating mechanism is designed to effect a snap action of the clutch collar 43 into and out of engagement with the clutch elements 44 and to maintain said collar in operative engagement under spring pressure. Referring particularly to Figures 2, 5 and 6, it will be observed that the left hand end plate 16 is provided with an extension forming a base or support 48. This support is provided at its extreme end with a bearing 49 within which is journalled a stub shaft 50. Upon the rear end of this stub shaft 50 is fixed the lower portion of the yoke 45, while the forward end of the shaft is bent upwardly to form a laterally extending arm 51. A second stub shaft 52 is likewise journalled in a bearing 53 formed on the base 48, and spaced from and in parallel relation to the stub shaft 50. An arm 54 has one end thereof fixed to the shaft 52, while its upper end is pivotally connected to one end of the reversing rod 46.

A third stub shaft 55 is journalled in a bearing 56 positioned directly above and in vertical alignment with the bearing 49 and shaft 50. The forward end of the shaft 55 is bent upwardly and outwardly to form a crank arm 57 which is connected to the shaft 52 through a link 58. This link is pivoted to the crank arm and also to an arm 59 fixed to the front of the shaft 52. The crank arm 57 is also operatively connected to the arm 51 of the shaft 50. This connection comprises a pair of complementary fingers 60. One finger is pivoted to the crank arm 57, while the other finger is pivoted to the free end of the arm 51. Each finger is provided with a flat face engageable with and slidable upon the complementary flat face of the other finger. Surrounding the fingers and maintaining them in contacting relation is a coil spring 61, the opposite ends of which engage the shoulders 62 on the fingers. This coil spring is constantly maintained under compression and the arrangement is such that movement of the crank arm 57 will compress the spring and slide the fingers relative to each other.

Assuming that the different elements of the clutching mechanism are in the position shown in Figures 6 and 7 with the clutch collar 43 engageable with the clutching element of the pulley 40, the shaft 32 will rotate in a direction to move the carriage 21 to the right as shown in Figure 2 until the arm 38 contacts the right hand stop element 47. Thereafter, further movement to the right of the carriage will shift the rod 46 to the right, and this will swing the arm 54, rotating the stub shaft 52. The arm 59 being fixed to shaft 52, will swing with the arm 54 and pull the link 58 to the right (see Figures 5 and 6). The link 58 being pivoted to the crank arm 57 will swing this arm upwardly, which will have the effect of telescoping or sliding the fingers 60 toward each other and compressing the coil spring 61. This action will continue until the crank arm 57 and fingers 60 are in substantial alignment. As soon as the link 58 tends to pull the crank 57 further to the right, this will move the fingers and crank arm out of alignment and there will be a snap action of the spring tending to move the fingers apart and at the same time expanding the spring which has been compressed to its fullest extent when the crank arm 57 and the fingers are in alignment. The snap action of the spring, moving the crank to the right, will throw the fingers 60 and spring 61 also to the right. This action, however, will function to move the arm 51 to the left, and since the yoke 45 is fixed to shaft 50, there will also be a snap action of the yoke and clutch collar 43 from one clutch element 44 to the other. In this new position, the spring will also be under tension. Therefore, the clutch collar will constantly be held in engagement with one or the other of the clutch elements 44 by spring pressure. Since the coil spring 61 is always compressed in each position of rest of the clutch collar, means are provided to limit the movement of the several elements so that the spring will not function to throw them too far in either direction. This means comprises a stop segment 59' fixed to an intermediate portion of the arm 59. As shown in Figures 5 and 6, one end of this stop engages the horizontal portion of the base 48. When the clutch is thrown in the other direction, the other end of the stop will strike the vertical portion 60' of the base. It is to be understood that this stop segment is so proportioned that it will cooperate with the other clutch elements to produce an efficient clutch mechanism.

As stated hereinbefore, the present invention is particularly adapted for sharpening lawn mowers, and means are provided for supporting a lawn mower in inverted position on the main frame below the auxiliary frame 15 and carriage 21. Means are also provided for quickly and accurately adjusting the carriage and grinding wheel in operative engagement with the blade or blades of the lawn mower to be sharpened. This means comprises mechanism for sliding the auxiliary frame forwardly and rearwardly on the main frame and for moving the auxiliary frame about its pivot 18 to raise and lower the carriage into and out of grinding position with the lawn mower.

Referring to Figures 2, 8 and 9, it will be observed that, in addition to constituting means for permitting the end plates 16 to slide thereon, the bolts 18 also support the rear ends of links 63. Each link 63 is provided with a short straight section which is pivoted on the bolt 18. This straight section extends downwardly below its respective plate 16 and is then curved forwardly and laterally so that it crosses under the plate. The extreme forward end of the right hand link is pivoted to a depending portion 64 of a hand lever 65. This lever is mounted on the end of the shaft 20 and is fixed thereto by a screw bolt or other fastening means 65'. The other link 63, that is, the one on the left hand side of the machine as shown in Figure 2, is likewise pivoted at its rear to its respective bolt 18. This link also crosses over under its end plate 16 and is pivoted to a depending arm 66. This arm corresponds to the depending portion 64 of lever 65, and is integral with a collar 67 which is fixed to the shaft 20. With this construction, movement of the hand lever 65 about the axis of the shaft 20 will effect a sliding movement of the end plates 16 forwardly or rearwardly depending upon the direction in which the hand lever is actuated. In view of the fact that the arm 66 is fixed to the shaft 20, operation of the hand lever 65 will also function to slide the left hand end plate and the entire auxiliary frame 15 forwardly and rearwardly. This operation will likewise effect forward and rearward movement of the carriage 21 and grinding wheel 26.

The lever 65 is provided with an intermediate laterally extending curved portion 68 having formed therein an arcuate slot 69. A threaded nut 70 is provided with a shank 71 projecting through the slot 69. The nut 70 is threaded upon a rod 72, the rear end of which is rotatably mounted in a bracket 73 secured to the upstanding portion 13 of the main frame. A hand grip 74 is secured to the rod to permit the same to be rotated. This construction is provided to give a fine adjustment of the hand lever after it has been actuated to move the auxiliary frame forwardly to its approximate grinding position. During actuation of the hand lever the shank 70 will slide in the arcuate slot 69. After the hand lever has been approximately adjusted, a wing nut 75 is tightened on the shank to lock the hand lever against movement relative to the nut 70. Thereafter, the hand grip 74 may be rotated to turn the adjusting rod 72 and thereby effect a fine adjustment of the hand lever 65. This will, of course, cause a slight movement of the auxiliary frame 15 and the grinding wheel 26. It is to be understood that, in some instances, it might not be necessary to employ the mechanism for effecting this fine adjustment of the lever 65 and that it may only be necessary to lock the hand lever 65 against movement by screwing up on the wing nut 75.

In addition to the means for sliding the auxiliary frame forwardly and rearwardly on the main frame, the mechanism for raising and lowering the auxiliary frame 15 to and from the work comprises means for swinging the frame about the bolts 18. This comprises a sleeve 76 which is rotatably mounted on the shaft 20 within the confines of the end plate 16. To the right hand end of this sleeve, as shown in Figures 8 and 9, is fixed a collar 77. A second hand lever 78 is integrally connected to and extends upwardly from the collar 77, while a curved arm 79 projects downwardly and outwardly from the collar and sleeve 76. On the left hand side of the machine a second collar 80 is fixed to the other end of the sleeve 76 and has a depending arm 81 corresponding to the arm 79. These arms 79 and 81 are pivotally connected each to one of a pair of rods 82 (see Figures 8 and 9). The lower end of each rod 82 is rotatably supported in a bracket 83 which is pivotally connected to the lower portion of the front leg of its respective end section 12. The upper end of each rod is preferably threaded and receives a nut 84 having a shank 85 upon which one of the arms 79 or 81 is pivotally supported. A wing nut or other suitable fastening element 86 is secured to the shank 85 and it is to be understood that the arrangement is such as to permit each arm to pivot on its respective shank 85 without binding.

With this construction, it will be apparent that when the hand lever 78 is actuated there will be a raising or lowering movement of the auxiliary frame 15 about the pivot point of the bolts 18. Movement of the lever 78 will move the arms 79 and 81 about the shanks 85. In view of the fact that the sleeve 76 is rotatably mounted on the shaft 20, there will be no binding action at this point, and a raising and lowering of the auxiliary frame and the carriage will be effected.

It is to be observed that the rods 82 not only cooperate with the lever 78 and other elements to effect a raising and lowering of the auxiliary frame 15, but also constitute means for supporting the front of the auxiliary frame. While two sets of rods 82 are shown in the drawings, it is to be understood that one rod may be eliminated, if desired. For instance, the left hand rod, that is, the one not shown in Figure 8, may be discarded, together with the collar and arm 80 and 81, respectively. The hand lever 78 would still function to raise and lower the auxiliary shaft. It is preferred, of course, to use two rods 82, since this will provide a more stable and rigid support for the auxiliary frame.

Means similar to that employed on the hand lever 65 is also utilized to secure a fine adjustment of the lever 78. In this connection, the lever 78 is provided with an arcuate slot 87 through which is received the shank of nut 88. This nut is threaded upon a shaft 89, the inner end of which is also pivoted to the bracket 73. A wing nut 90 is employed to lock the lever in adjusted position.

In addition to utilizing the rod 89 to provide a fine adjustment, it is possible to accomplish this by rotating the threaded rods 82, since each rod is provided adjacent its upper end with a hand grip 91 for permitting the rod to be rotated in the nut 84. This may be accomplished since the lower end of each rod 82 is rotatably mounted in its bracket 83.

Figures 10, 11:
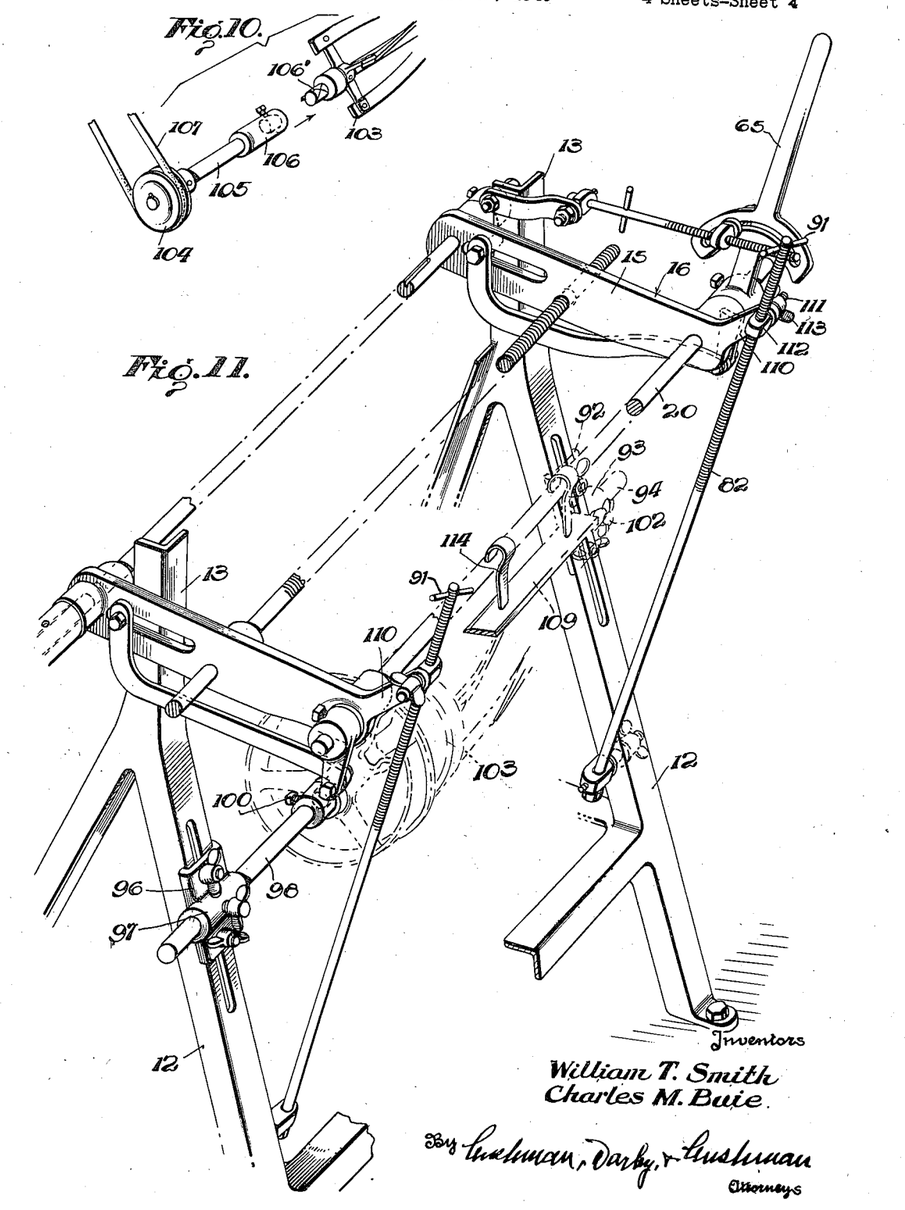
Figure 10 is a fragmentary detail showing the stub shaft for transmitting power to the cutter reel of a lawn mower.
Figure 11 is a perspective view showing a modified form of the invention.

Means are provided for supporting a lawn mower on the lower portion of the main frame in position to be sharpened, without the necessity of entirely disassembling the mower. Referring particularly to Figure 8 the numeral 92 designates a vertically adjustable bracket supported on one of the legs of the right hand end section 12. This bracket carries a collar or chuck clamp 93 within which is slidably and adjustably mounted a chuck 94 having an axle engaging socket 95 at one end. Referring to Figures 2 and 11, there is shown an adjustable bracket 96 corresponding to the bracket 92 and also provided with a chuck clamp 97. A chuck 98 is adjustably mounted in the clamp 97 and is provided with a socket on its inner end for receiving one end of the main shaft of a lawn mower.

Before a lawn mower is mounted on the frame, it is necessary to remove both cover plates or traction wheels so as to expose both ends of the main driving shaft 99 of the mower. After the traction wheels have been removed, the mower is placed in inverted position so that one end of the exposed shaft 99 is inserted in the socket of the chuck 98. Thereafter, the screw nut 100 is tightened to engage and clamp one end of the shaft 99 in the socket of chuck 98. The chuck 94 is then moved in its clamp 93 until the socket 95 receives the other end of the shaft 99 of the mower (see Figure 8). Thereafter, the screw nuts 101 and 102 are tightened and the mower is firmly supported in sharpening position with both the cutter reel and blade exposed and accessible to the grinding wheel. It will, of course, be necessary to slightly raise the stationary blade of the lawn mower out of its normal position relative to the cutter reel so that one of these elements will not interfere with the other as it is being sharpened.

The cutter reel 103 of the lawn mower is adapted to be rotated as it is being ground and the means for imparting rotary motion thereto comprises a pulley 104 (see Figures 1, 2 and 10). This pulley is fixed to one end of a stub shaft 105, while a socket 106 is formed on the other end of the shaft. This socket is adapted to receive one end of the cutter reel shaft 106', but before this can be accomplished the usual traction wheel engaging pinion must be removed from that end of the reel shaft. After this pinion is removed, however, the socket 106 may be slipped over the end of the shaft 106' and fixed thereto. A belt 107 connects the pulley 104 with the main driving shaft 19 and transmits power therefrom to the pulley and the cutter reel.

Assuming that it is desired to first sharpen the blades of the cutter reel 103 of the lawn mower, the levers 65 and 78 are actuated to bring the grinding wheel 26 into operative engagement with the blades. Preferably, the hand lever 65 is first actuated to slide the auxiliary frame 15, carriage 21 and grinding wheel 26 over the reel. Thereafter, the lever 78 is actuated to lower the carriage and grinding wheel into substantial sharpening engagement. The levers are locked in adjusted position and if necessary either one or all of the fine adjustment rods may be actuated to position the grinding wheel in the final reel blade grinding position. Thereafter, the motor 29 is started by operating the switch 108. This will impart reciprocating motion to the carriage 21 which will reciprocate back and forth between stop elements 47. It is to be understood that these stop elements have been set to the desired position so that the full length of the cutter reel 103 may be sharpened.

As the carriage is moved back and forth on the auxiliary frame the grinding wheel will be rotated at high speed and power will likewise be transmitted from the main shaft to the pulley 104 to rotate the cutter reel. The construction is such that these two members rotate in directions adapted to effect the correct grinding or sharpening action to the curved blades of the cutter reel. In other words, assuming that the grinding wheel is rotating in the direction of the arrow (see Figure 3), that is in a clockwise direction, the cutter reel 103 will also be rotated in a clockwise direction. This will have the effect of moving the cutter blades against the direction of rotation of the grinding wheel and thereby effect the desired grinding operation. The carriage is reciprocated back and forth as long as desired and until the grinding wheel has had an opportunity to effectively sharpen all of the blades of the cutter reel.

After the cutter reel has been sharpened, it is an easy matter to sharpen the stationary blade 109. The hand levers 65 and 78 may be operated, as above described, to move the grinding wheel 24 so that it will be positioned above the blade 109. Thereafter, each one of the fine adjusting means is actuated to move the grinding wheel to the position shown in Figure 3. When the motor is started, the carriage will reciprocate back and forth between the stop elements, and, in doing so, will grind and effectively sharpen the blade 109.

Referring again to Figure 11, there is disclosed a modified means for raising and lowering the auxiliary frame 15. In this construction, the second lever 78 and sleeve 76 have been eliminated, and the rods 82 are directly connected to the front ends of the end plates 16. In this connection, each end plate is provided with a forward extension or arm 110 which is provided with an opening for receiving the shank 111 of a threaded nut 112. This nut is threaded upon the upper end of its respective rod 82 and a wing nut 113 is provided to secure the nut to the front of the end plate. In this construction, after the lever 65 has been operated to move the carriage forwardly over either the cutter reel or blade of the lawn mower, the operator grasps the hand grip 91 of each rod 82 and rotates the same to lower the auxiliary frame and carriage into operative grinding engagement. If desired, a gauge 114 may be provided to check whether or not one of the rods has been turned more than the other. This gauge is adapted to be moved over the front guide shaft 20. As clearly shown in Figure 11 and assuming that the stationary blade 109 is to be sharpened, the accuracy of the adjustment may be easily determined by sliding the gauge along the rod.

From the foregoing, it will be apparent that we have provided a grinding machine which is capable of sharpening a lawn mower without the necessity of entirely disassembling the mower; that, furthermore, the cutter reel of the mower may be sharpened without removing the stationary cutter blade; and that we have provided means to easily and quickly adjust the grinding carriage and auxiliary frame relative to the lawn mower.

It is to be understood that the forms of the invention shown and described are illustrative of the preferred embodiment, and that such changes may be made without departing from the spirit of the invention as fall within the purview of one skilled in the art.

We claim:

1. In a grinding machine, a main frame, an auxiliary frame pivotally and slidably mounted on said main frame, a reciprocatory carriage mounted on said auxiliary frame, a grinding tool supported on said carriage, work supporting means mounted on said main frame below said carriage, means operatively associated with said main and auxiliary frames for sliding the latter forwardly and rearwardly relative to the work supporting means, and means also associated with said main and auxiliary frames for moving the latter about its pivot to raise and lower said auxiliary frame and carriage into and out of operative engagement with the work to be ground.

2. In a grinding machine, a main frame, an auxiliary frame pivotally and slidably mounted on said main frame, a reciprocatory carriage mounted on said auxiliary frame, a grinding tool supported on said carriage, work supporting means mounted on said main frame below said carriage and adapted to support a lawn mower in inverted position with the stationary blade located above the cutter reel, means operatively associated with said main and auxiliary frames for sliding the latter forwardly and rearwardly relative to either the stationary blade or cutter reel, and means also associated with said main and auxiliary frames for moving the latter about its pivot to raise and lower said auxiliary frame and carriage into and out of operative engagement with either the stationary blade or the cutter reel without removing either the blade or reel from the work supporting means.

3. In a grinding machine, a main frame, an auxiliary frame including a pair of end plates movably mounted in said main frame, a guide shaft extending between said end plates and journalled therein adjacent the front of the auxiliary frame, a reciprocatory carriage mounted on said auxiliary frame between said end plates and slidable on said guide shaft, a grinding tool carried by said carriage, work supporting means mounted on said main frame below said carriage, a hand lever fixed to said guide shaft and having a depending portion extending below said shaft, and linkage mechanism operatively connecting said depending portion of the lever with said main frame whereby operation of said lever will move said auxiliary frame and carriage back and forth in the main frame.

4. In a grinding machine, a main frame, an auxiliary frame movably mounted in the main frame and including a pair of end plates, each plate provided with a longitudinally extending slot, a guide shaft extending between said end plates and journalled therein forwardly of said slots, a reciprocatory carriage mounted on said auxiliary frame between said end plates and slidable on said guide shaft, a grinding tool carried by said carriage, a hand lever fixed to one end of said guide shaft and having a depending portion extending below said shaft, a curved link having its front end pivoted to said depending portion of the lever, the other end of said link terminating in close proximity to one of said end plates adjacent its slot, and a fastening element passing through said slot and pivotally connecting said last mentioned end of the link to the main frame whereby operation of the lever will slide said auxiliary frame and carriage back and forth in the main frame.

5. In a grinding machine, a main frame, an auxiliary frame including a pair of end plates movably mounted in said main frame, a guide shaft extending between said end plates and journalled therein adjacent the front of the auxiliary frame, a reciprocatory carriage mounted on said auxiliary frame between said end plates and slidable on said guide shaft, a grinding tool carried by said carriage, work supporting means mounted on said main frame below said carriage, a hand lever fixed to said guide shaft and having a depending portion extending below said shaft, linkage mechanism operatively connecting said depending portion of the lever with said main frame whereby operation of said lever will move said auxiliary frame and carriage back and forth in the main frame, and means for raising and lowering said auxiliary frame including a rod pivoted at one end to the main frame and constituting a support for the front of the auxiliary frame.

6. In a grinding machine, a main frame, an auxiliary frame including a pair of end plates movable mounted in said main frame, a guide shaft extending between said end plates and journalled therein adjacent the front of the auxiliary frame, a reciprocatory carriage mounted on said auxiliary frame between said end plates and slidable on said guide shaft, a grinding tool carried by said carriage, work supporting means mounted on said main frame below said carriage, a hand lever fixed to said guide shaft and having a depending portion extending below said shaft, linkage mechanism operatively connecting said depending portion of the lever with said main frame whereby operation of said lever will move said auxiliary frame and carriage back and forth in the main frame, and means for raising and lowering said auxiliary frame including a rod pivoted at one end to the main frame and constituting a support for the front of the auxiliary frame, said rod having its upper end threadedly engageable with an element of the auxiliary frame whereby rotation of said rod will raise or lower the front of the auxiliary frame.

7. In a grinding machine, a main frame, an auxiliary frame including a pair of end plates movably mounted in said main frame, a guide shaft extending between said end plates and journalled therein adjacent the front of the auxiliary frame, a reciprocatory carriage mounted on said auxiliary frame between said end plates and slidable on said guide shaft, a grinding tool carried by said carriage, work supporting means mounted on said main frame below said carriage, a hand lever fixed to said guide shaft and having a depending portion extending below said shaft, linkage mechanism operatively connecting said depending portion of the lever with said main frame whereby operation of said lever will move said auxiliary frame and carriage back and forth in the main frame, and means for raising and lowering said auxiliary frame including a rod pivoted at one end to the main frame and having its upper end threaded, a threaded nut pivotally mounted on the front of one of the end plates and engageable with the threaded portion of the rod for supporting the front of the auxiliary frame and permitting raising and lowering of said auxiliary frame on the main frame.

8. In a grinding machine, a main frame, an auxiliary frame including a pair of end plates pivotally mounted in said main frame, a guide shaft extending between said end plates and journalled therein adjacent the front of the auxiliary frame, a reciprocatory carriage mounted on said auxiliary frame between said end plates and slidable on said guide shaft, a grinding tool carried by said carriage, work supporting means mounted on said main frame below said carriage, and means for adjusting said auxiliary frame about its pivot including a rod having its lower end pivoted to said main frame, and an element carried by said guide shaft and pivotally connected to said rod adjacent its upper end.

9. In a grinding machine, a main frame, an auxiliary frame including a pair of end plates pivotally mounted in said main frame, a guide shaft extending between said end plates and journalled therein adjacent the front of the auxiliary frame, a reciprocatory carriage mounted on said auxiliary frame between said end plates and slidable on said guide shaft, a grinding tool carried by said carriage, work supporting means mounted on said main frame below said carriage, means for adjusting said auxiliary frame about its pivot including a rod having its lower end pivoted to said main frame, and a hand lever pivotally mounted on said guide shaft and having a depending arm pivotally connected to said rod adjacent its upper end.

10. In a grinding machine, a main frame, an auxiliary frame pivotally and slidably mounted in the main frame and including a pair of end plates, each plate provided with a longitudinally extending slot, a guide shaft extending between said end plates and journalled therein forwardly of said slots, a reciprocatory carriage mounted on said auxiliary frame between said end plates and slidable on said guide shaft, a grinding tool carried by said carriage, a hand lever fixed to one end of said guide shaft and having a depending portion extending below said shaft, a curved link having its front end pivoted to said depending portion of the lever, the other end of said link terminating in close proximity to one of said end plates adjacent its slot, a fastening element passing through said slot and pivotally connecting said last mentioned end of the link to the main frame whereby operation of the lever will slide said auxiliary frame and carriage back and forth in the main frame, a second hand lever pivotally mounted on said guide shaft and having a depending portion extending laterally thereof, a rod pivoted to the main frame and pivotally connected to the laterally extending portion of the second hand lever, whereby operation of said second lever will raise and lower said auxiliary frame on the main frame to adjust the carriage and grinding tool relative to the work.

11. In a grinding machine, a main frame, an auxiliary frame, including a pair of end plates pivotally and slidably mounted in said main frame, a guide shaft extending between said end plates and journalled therein adjacent the front of the auxiliary frame, a reciprocatory carriage mounted on said auxiliary frame between said end plates and slidable on said guide shaft, a grinding tool carried by said carriage, work supporting means mounted on said main frame below said carriage, a hand lever fixed to said guide shaft, means connecting said hand lever to said main frame for sliding said auxiliary frame on said main frame upon actuation of said lever, a second hand lever pivotally mounted on said guide shaft coaxially with said first hand lever, and means connecting said second hand lever to said main frame for raising and lowering said auxiliary frame on said main frame upon actuation of said second hand lever.

12. In a grinding machine, a supporting frame, a reciprocatory carriage mounted on said frame, a feed shaft journalled in said frame and operatively connected to said carriage for reciprocating the same in the frame, a pair of rotary power transmitting elements loosely mounted on one end of said feed shaft, each provided with a clutch element, a clutch collar slidably mounted on said shaft but fixed to rotate therewith and alternatively movable into engagement with said clutch elements whereby said shaft may be rotated in opposite directions, a yoke connected to said collar, a stub shaft journalled in said frame and having one end fixed to said yoke, an arm fixed to and extending laterally of said stub shaft, a reversing rod mounted on said frame and provided with stops located in the path of said carriage, a second stub shaft journalled in said frame adjacent to and in parallel relation to said first shaft and having an arm fixed thereto and pivotally connected to said reversing rod, a second arm fixed to said second stub shaft, and spring controlled mechanism connecting said last-mentioned arm and the lateral arm of the first mentioned stub shaft and adapted upon actuation of the reversing rod to effect a snap action of said clutch collar and to maintain said collar in operative engagement under spring pressure.

13. In a grinding machine, a supporting frame, a reciprocatory carriage mounted on said frame, a feed shaft journalled in said frame and operatively connected to said carriage for reciprocating the same in the frame, a pair of rotary power transmitting elements loosely mounted on one end of said feed shaft, each provided with a clutch element, a clutch collar slidably mounted on said shaft but fixed to rotate therewith and alternatively movable into engagement with said clutch elements whereby said shaft may be rotated in opposite directions, a yoke connected to said collar, a stub shaft journalled in said frame and having one end fixed to said yoke, an arm fixed to and extending laterally of said stub shaft, a reversing rod mounted on said frame and provided with stops located in the path of said carriage, a second stub shaft journalled in said frame adjacent to and in parallel relation to said first shaft and having an arm fixed thereto and pivotally connected to said reversing rod, a second arm fixed to said second stub shaft, a third stub shaft journalled in said frame directly above and in vertical alignment with said first-mentioned stub shaft, a crank arm fixed to one end of said third stub shaft, a link connecting said crank arm to the arm of the second stub shaft, and a spring controlled mechanism connecting said crank arm to the laterally extending arm of said first stub shaft and adapted upon actuation of the reversing rod to effect a snap action of said clutch collar and to maintain said collar in operative engagement under spring pressure.

14. In a grinding machine, a supporting frame, a reciprocatory carriage mounted on said frame, a feed shaft journalled in said frame and operatively connected to said carriage for reciprocating the same in the frame, a pair of rotary power transmitting elements loosely mounted on one end of said feed shaft, each provided with a clutch element, a clutch collar slidably mounted on said shaft but fixed to rotate therewith and alternatively movable into engagement with said clutch elements whereby said shaft may be rotated in opposite directions, a yoke connected to said collar, a stub shaft journalled in said frame and having one end fixed to said yoke, an arm fixed to and extending laterally of said stub shaft, a reversing rod mounted on said frame and provided with stops located in the path of said carriage, a second stub shaft journalled in said frame adjacent to and in parallel relation to said first shaft and having an arm fixed thereto and pivotally connected to said reversing rod, a second arm fixed to said second stub shaft, a third stub shaft journalled in said frame directly above and in vertical alignment with said first-mentioned stub shaft, a crank arm fixed to one end of said third stub shaft and of substantially less length than the arm of said first stub shaft, a link connecting said crank arm to the arm of said second stub shaft, a pair of complementary fingers, one pivoted on the crank arm and the other pivoted on the arm of the first stub shaft, each finger having a flat face slidable upon the face of the other finger, and a coil spring surrounding said fingers and maintained under compression between said crank arm and the arm of the first stub shaft, said spring acting to effect snap action of said clutch collar and maintaining said collar in operative engagement under spring pressure.

WILLIAM THOMAS SMITH.
CHARLES MALCOLM BUIE.